(12) United States Patent
Zhu et al.

(10) Patent No.: US 7,447,775 B1
(45) Date of Patent: Nov. 4, 2008

(54) METHODS AND APPARATUS FOR SUPPORTING TRANSMISSION OF STREAMING DATA

(75) Inventors: Liping Zhu, San Jose, CA (US); Jin Zhang, San Jose, CA (US); Jonathan L. Lemon, Stoughton, WI (US); Zheng Yang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 956 days.

(21) Appl. No.: 10/703,825

(22) Filed: Nov. 7, 2003

(51) Int. Cl.
*G06F 15/16* (2006.01)
(52) U.S. Cl. .................. 709/226; 709/217; 709/227
(58) Field of Classification Search .......... 709/226, 709/216, 227
See application file for complete search history.

(56) References Cited

U.S. PATENT DOCUMENTS

| | | | |
|---|---|---|---|
| 6,172,991 B1 * | 1/2001 | Mori ........................ | 370/474 |
| 6,862,624 B2 | 3/2005 | Colby et al. ............... | 709/226 |
| 7,003,571 B1 | 2/2006 | Zombek et al. ............ | 709/227 |
| 7,159,235 B2 * | 1/2007 | Son et al. .................. | 725/91 |
| 2002/0073232 A1 * | 6/2002 | Hong et al. ................ | 709/238 |
| 2003/0014531 A1 * | 1/2003 | Bodin et al. ............... | 709/231 |
| 2004/0047354 A1 * | 3/2004 | Slater et al. ............... | 370/400 |

* cited by examiner

*Primary Examiner*—William C. Vaughn, Jr.
*Assistant Examiner*—Djenane M Bayard
(74) *Attorney, Agent, or Firm*—BainwoodHuang

(57) ABSTRACT

A gateway application in a content engine multiplexes requests for real-time content to servers that, in turn, service the requests by streaming appropriate real-time content to requesting users. A software communication port of the content engine may be reserved to receive request messages from multiple client computers, at least two of which request streaming of real-time content according to different selected formats. After identifying client properties (e.g., a format for which to receive streaming real-time content) associated with the requests for real-time content, the gateway application identifies corresponding servers of the content engine to serve the real-time content according to the different selected formats. The gateway application forwards the requests for streaming of real-time content associated with the request messages to the corresponding servers which, in turn, satisfy the requests by streaming the requested real-time content to the client computers.

30 Claims, 8 Drawing Sheets

METHODS AND APPARATUS FOR SUPPORTING TRANSMISSION OF STREAMING DATA

BACKGROUND OF THE INVENTION

Computer and information networks such as the Internet enable computer systems to exchange streams of data such as audio data, video data, multimedia data or other streaming data between software applications running on different computer systems. As an example, a user controlling a web browser operating on a client computer system can select a hyperlink that corresponds to an audio stream data or audio file that an audio stream server computer system can serve to the client computer system over the Internet. In response to a selection of the hyperlink, the web browser can invoke an audio player software application that operates in conjunction with the web browser on the client computer system to play the audio file. Typically, an audio player software application can communicate with the audio stream server software application running on the audio stream computer system in order to establish an audio stream data connection between the client computer system and the audio server. Once such a connection is established, the audio stream server can begin serving or streaming the audio stream data back to the audio player software application operating on the client computer system. The audio player software application can then receive and play the audio data via speakers coupled to the client computer system for the enjoyment by the user.

Due to the real-time or near real-time nature of audio data, video data, multimedia data or other such data, the audio player software application and audio stream server software application may utilize one or more real-time or near real-time data transfer communication or control protocols in order to appropriately control the flow of streaming data from the stream server to the client computer system. An example of such a real-time data transfer communications or control protocol is the Real Time Streaming Protocol (RTSP). Other such protocols exist as well.

Generally, RTSP is an application-level protocol for controlling the delivery of data with real-time properties such as audio data, video data, and the like. RTSP provides a framework to establish and control one or more time-synchronized streams of continuous media such as audio and video stream data supplied from a stream server to a client computer system. RTSP messages do not ordinary deliver or carry the continuous streaming data itself, but rather operate as a set of out-of-band messages or requests exchanged between the client and a stream server to control and synchronize delivery of the streaming data. It is possible for RTSP to actually carry the streaming data on the same control connection. However, in an overwhelming majority of RTSP streaming data applications, streaming data is sent separately from control information. Thus, RTSP enables client computers to "remotely control" streaming data from multimedia servers.

According to the general operation of RTSP, the client and a stream server exchange RTSP requests in order to adjust the flow of stream data served from the stream server to the client. As an example, a client may send an RTSP "PLAY" request specifying an offset, play time, location or absolute position in the stream data at which to begin playing or serving the stream data. The stream server receives the RTSP PLAY request and begins serving the stream data at the requested play time. The server also sends a "200 OK" back to the client on the control connection, indicating that everything is alright and that the server will start sending the data stream. This response is sent on all control received by the sever from the client. In case of an error, the response will not be "200 OK" but will instead be a "400 bad request" or similar type of message. During receipt of the streaming data from the server, the client may wish to alter a transmission characteristic of the stream data such as, for example, to increase or decrease the bandwidth or rate at which the stream server serves the stream data, or to seek forward in the stream data to a desired offset (referred to as absolute positioning). For instance, the client may detect that the stream server needs to serve the streaming data at a higher bandwidth or rate in order for the client to be able to reproduce the stream data for the user in a realistic or real-time manner or at a better quality of service. In response, the client may send an RTSP message to increase the rate at which the stream server serves the streaming data. This RTSP message or request propagates through the network (i.e., through a series of one or more data communications devices such as switches and routers) to the stream server. The stream server adjusts the bandwidth or rate of streaming data from the server according to the RTSP bandwidth adjustment message. Bandwidth may be implemented as a method command (e.g., similar to "PLAY," "PAUSE," etc.) or alternatively bandwidth information may be included in a header of a method command.

As another example, if the user at the client computer desires to rapidly advance forward or backward in the data stream, the user may operate fast-forward or rewind buttons provided by the audio client software application (e.g., via a graphical user interface). Operating the fast forward or rewind buttons causes the client to issue one or more RTSP requests to the stream server, each RTSP request specifying a particular incremented offset or absolute position within the stream data at which the server is to begin serving the stream data. The offset or absolute positions are typically identified relative to the beginning of the stream data. Accordingly, if the user depresses and holds a "FAST FORWARD" graphical user interface button provided by the client receiving the stream data, the client will issue a series of RTSP play requests each containing successively incremented absolute position values. It is also possible for a client to issue just one request (or two requests) instead of a series of many commands to achieve this goal. Upon receipt of each of such RTSP play requests, the stream server begins serving stream data at the indicated absolute or relative position in the stream data until the next request is received to provide the appearance to the user of rapidly playing or advancing ahead into the streaming data.

For complete details on the operation of RTSP, the reader is directed to Request For Comment 2326 (RFC-2326) which is a document maintained by the Internet Engineering Task Force (IETF) that specifies an Internet standards track protocol for RTSP. The teaching and contents of the RFC-2326 document are hereby incorporated by reference herein in their entirety.

Other conventional data transfer communications protocols can carry out the processing and messaging required to carry or transport the actual stream data to a user. As an example, the Real Time Protocol (RTP) can be used as a transport mechanism to propagate real-time streaming data through a computer network. In general, the RTP protocol encodes real-time stream data into packets, each of which includes sequencing and/or timing information stored in virtual time fields. The timing information enables a recipient to identify how the portions of stream data in one RTP encoded packet relate to other portions of stream data in other RTP packets. Thus, RTP can encode data with timing information about the media to provide a reference to the recipient for how the media can be played back.

SUMMARY

Conventional techniques for controlling the transmission of streaming data (e.g., real-time streaming data) suffer from certain deficiencies. One such deficiency is that conventional techniques do not provide a way of simultaneously supporting different types of server applications (e.g., all major types of RTSP-based streaming servers and proxies) on a content engine (e.g., content engine refers to a generic device that serves streaming data) that services different types of requests such as RTSP-based requests directed to Apple™ Darwin streaming servers (e.g., QuickTime™ server), Real Server™, Real Proxy™, (produced by Real Networks™) etc. Thus, a single computer operating as a content engine may be limited to supporting only a single server type to stream data to requesting users based on use of one type of real-time streaming format. This is very limiting because requests sent to the content engine for servicing themselves may be limited to a single type.

There are technical hurdles associated with attempting to simultaneously operate different types of servers and proxies in the same content engine. For example, one technical hurdle is the occurrence of potential port conflicts. A well-known RTSP TCP port for handling RTSP commands is port number 554. If a content engine only has one RTSP-based server or proxy running on it, there is no problem regarding port conflicts because requests on the dedicated port can be serviced by the sole server. However, a content engine supporting multiple RTSP-based servers and proxies as stated above may need to invoke non-standard TCP ports for different RTSP-based streaming data.

Another technical hurdle associated with simultaneously operating different types of servers and proxies in the same content engine is request dispatching. Different RTSP-based servers and proxies have different abilities in serving various types of received RTSP requests. For example, Cisco Streaming Engine (e.g., an enhanced version of a Darwin™ streaming server) can serve requests from QuickTime player, but not requests from Real player. Real Server can serve stream files from local disk, but Real proxy has to be used to contact a remote server if content is not found locally. It is cumbersome to require users have to manually figure out the proper server or proxy to send each RTSP request.

Yet another technical hurdle associated with simultaneously operating different types of servers and proxies in the same content engine is use of a transparent agent. For example, certain network products, such as routers and Content Smart Switches (CSS), have the ability to transparently intercept RTSP/TCP traffic. These devices typically listen for requests received on TCP port 554 (the standard RTSP port) and intercept and send such requests to a content engine. However, only one application on the content engine can register to receive such intercepted RTSP requests. It is undesirable to force, for example, a particular server to receive all or multiple types of RTSP requests because some of the requests may need to be serviced by another type of server. In such an instance, a requesting user may be denied access to otherwise available data information because a server receiving the request cannot service it.

Still another technical hurdle associated with simultaneously operating different types of servers and proxies in the same content engine is uniformity and redundancy. For example, a content engine may need to provide many basic services, which all applications on the content engine are supposed to use. Such services may include authentication, request filtering, rules processing, etc. It is not desirable to expect each RTSP server and proxy application on a content engine to essentially repeat the same processing and handling tasks of individually servicing each of the requests. In some cases, it is not possible for a server to even process certain types of requests. In such instances, processing is a waste of time.

One solution for enabling multiple servers to simultaneously operate on a single content engine is to modify the server applications themselves so that they may be simultaneously executed in a single content engine. In one embodiment of the invention, multiple RTSP servers run simultaneously on a single content engine as separate processes, each having separate configurations. Alternatively, it would not be easy to run the servers as a same application in the same process group having the same configuration, forming a single "super-server." As mentioned, alternatively executing only a single server in a content engine such as a single host computer limits the ability of the content engine to servicing requests of a particular type.

It is an advancement in the art to provide a gateway application in a content engine to process requests (e.g., RTSP-based requests) for content so that each of multiple different types of server applications can simultaneously run on the same computer system to service the content requests. More specifically, an embodiment of the invention includes providing a gateway application for use in a content engine to demultiplex or dispatch requests for real-time content to servers that, in turn, service the requests by streaming appropriate real-time content to requesting users. A software communication port of the content engine is reserved to receive request messages from multiple client computers, at least two of the request messages including requests for streaming of real-time content according to different selected formats. After identifying properties (e.g., a format for which to receive streaming real-time content) associated with the requests for real-time content, the gateway application identifies corresponding servers of the content engine to serve the real-time content according to the different selected formats. The gateway application forwards the requests for real-time content associated with the request messages to the corresponding servers which, in turn, satisfy the requests by streaming the requested real-time content to the client computers according to a specific format understood by the receiving client. Use of a gateway application to handle incoming requests for multiple servers reduces a need for separate hardware resources because a common hardware resource such as a single computer may operate multiple server applications to service many different types of requests for media data. In one application of the invention, the servers of the content engine that service the requests establish corresponding links directly with requesting users to stream data, bypassing the port of the content engine on which the corresponding request messages are originally received. Thus, gateway application need only process incoming requests rather than served data. Benefits of utilizing gateway application 140 include reduced data copying and increased performance.

Use of the aforementioned gateway application in a content engine solves the problem of potential port conflicts because the gateway may be configured to receive different types of requests on the standard RTSP port number 554 and dispatch (e.g., multiplex) them to the appropriate one of multiple back-end servers. Furthermore, use of the gateway application may solve the problem of dispatching requests because the gateway application can be configured to first process received requests to identify their corresponding properties and then forward them to the appropriate server. Moreover, use of the gateway application may solve the problem of transparency because the gateway application can be configured to be the "agent" itself that forwards the requests to the appropriate servers in the content engine. Finally, use of the gateway application may reduce redundant processing because the gateway application can be configured to support services such as authentication, request filtering, rules processing, etc. for the different requests so that multiple servers each do not have to repeat the same service tasks.

Accordingly, a general embodiment of the invention involves a technique of supporting transmission of streaming data from a content engine coupled to a network to requesting sources. For example, a gateway application in the content engine receives a request message including a request for particular data over the network. The content engine includes at least two different types of servers to service the request for particular data. To service the request, the gateway application identifies client type properties or other request properties such as an extension associated with a requested file (e.g., .mov VS, .rm VS, .mp4, etc.) associated with the received request message. Depending on the identified client type properties or other request properties associated with the received request message, the gateway application in the content engine forwards the request for particular data to one of the at least two different types of servers of the content engine to stream the particular data to the requesting source. Use of the gateway application to process and forward different types of requests minimizes resources otherwise necessary to perform redundant processing of the requests.

In further embodiments and yet other independent embodiments of the invention, the content engine and, more specifically, the gateway application may dedicate a single software communication port on which to receive requests from multiple requesting sources that request data from the at least two different types of servers in the content engine. Each of at least two of the multiple requests from the same or different requesting sources may include information identifying a unique format in which to receive streaming real-time data from the content engine. Consequently, one requesting source may request the same content of streaming data from a first server of the content engine according to a first format (e.g., protocol) type while a second requesting source may request streaming data from a second server of the content engine according to a different, unrelated second format type. In a specific embodiment, the single (dedicated) software communication port of the gateway application is default RTSP (Real Time Streaming Protocol) port number 554 as specified by Request For Comment 2326.

In one embodiment, the gateway application of the content engine identifies client type properties associated with a request message based on processing information in headers of the received request message. Client type properties may include an identity of: i) a user agent sending a request message, ii) a destination of a request message, iii) a media file type associated with requested data, etc.

In one embodiment, the request message from the corresponding requesting source is received according to a predetermined format. The gateway application applies a set of rules to the received request message and, on behalf of the at least two different types of servers that may otherwise be required to receive and process the request message if not for the gateway application, the gateway application rewrites at least a portion of the request message to include information for retrieving the particular data from one of the at least two different types of servers of the content engine.

If the particular requested data is not stored in a local storage device associated with the content engine, the gateway application or corresponding server may redirect the request message to another content source that provides the particular data to the corresponding requesting source. Thus, a server of the content engine may retrieve a file from a local storage device and serve the requesting source with requested data or alternatively act as a proxy to service the request.

In addition to applying a set of rules to service the request as discussed above, the gateway application may include a filter to identify whether to deny servicing the request for the particular data. If access to data is denied, the content engine may transmit a reply message to the corresponding requesting source indicating that service associated with the requested content has been denied.

In one embodiment, if the gateway application determines that the particular requested data associated with the received request message is stored in a local storage device associated with the content engine, the appropriate server of the content engine to which the request message is forwarded transmits the particular data associated with the request message to the requesting source by bypassing the software communication port of the gateway application on which the request message was originally received. This technique of bypassing the gateway application and corresponding dedicated port may significantly reduce traffic that must be handled by the gateway application. For example, the request messages themselves may be minimal in size compared to a bulkiness of streaming data information sent from the servers to the requesting sources such as client computers on a network. Forcing the gateway application to otherwise process and handle data packets in both directions would require more hardware resources and introduces longer streaming data delays between the client and the server. Bypassing the software communication port of the gateway application may include spoofing a corresponding server, to which a request is originally forwarded, into believing that the request for the particular data was received directly from a corresponding requesting source instead of being forwarded from the gateway application in the content engine that forwards the request to the corresponding server. Thus, the gateway application may receive requests on a first communication link between the requesting source (e.g., a client) and the gateway application of the content engine. The gateway application may forward a request message over a second link between the gateway application and server. Finally, the server may serve requested data stream information to the corresponding requesting client based on a third link between the server and the client. In one embodiment, the first link and the second link are established based on a connection-oriented protocol such as TCP/IP. The third is established based on a connection-less protocol such as UDP (User Datagram Protocol). The aforementioned links may be connections established according to a connection-oriented protocol such as TCP (Transmission Control Protocol).

More specifically, in one embodiment, forwarding the request for particular data is supported at least in part by establishing a communication session (e.g., the second link as discussed above) between the gateway application and the corresponding server. This communication session may include a software communication port associated with the gateway application through which the request message is forwarded to the corresponding server. An operating system of the content engine may facilitate maintaining an alias associated with the software communication port of the gateway application such that, when the corresponding server inquires as to an address of the gateway application forwarding the request to the corresponding server, the gateway application supplies the alias (e.g., an identity of the requesting source) to the corresponding server to spoof the corresponding server into believing that the forwarded request was received directly from the requesting source instead of the gateway application.

Embodiments of the present invention may be employed such that the servers of the content engine run on a single operating system of a computer having access to stored files of raw data that are served to the user for playback in real-time. The kernel of the operating system is optionally modified to support spoofing and use of an alias as mentioned above. Thus, use of the aforementioned and following techniques is particularly well-suited for systems in which the request message includes a request for particular data that, when served to the requesting source from the content engine, is played back in real-time for a user.

Other embodiments of the invention include a computer system, such as a data communications device, computerized device, or other device configured with software and/or circuitry to process and perform all (or a portion thereof) of the method operations noted above and disclosed herein as embodiments of the invention. In such embodiments, the device, such as a data communications device, comprises one or more communications interfaces (e.g., network interfaces), a memory (e.g., any type of computer readable medium, storage or memory system), a processor and an interconnection mechanism connecting the communications interface, the processor and the memory. In such embodiments, the memory system is encoded with a gateway application that causes the computer system to perform any part and/or all of the method embodiments, steps and operations explained herein as embodiments of the invention. In other words, a computer, switch, router, content engine or other communication or data serving device that is programmed or otherwise configured to operate as explained herein is considered an embodiment of the invention.

One embodiment of the present invention is directed to a computer program product that includes a computer readable medium having instructions stored thereon for configuring a network node to support routing of network messages. The instructions, when carried out by a processor of the data communication device, cause the processor to perform the steps of: i.) from a requesting source communicating over the network, receiving a request message including a request for particular data from the content engine, the content engine including at least two different types of servers to service the request for particular data; ii.) identifying client type properties associated with the received request message; and iii.) depending on the identified client type properties associated with the received request message, forwarding the request for particular data to one of the at least two different types of servers of the content engine to stream the particular data to the requesting source. Other arrangements of embodiments of the invention that are disclosed herein include software programs to perform any of the method embodiment steps and operations summarized above and disclosed in detail below.

Embodiments of the invention may be implemented by computer software and/or hardware mechanisms within any type of computing apparatus. It is to be understood that the certain embodiments of the invention can be embodied strictly as a software program, as software and hardware, or as hardware and/or circuitry alone such in a content engine coupled to a network. The features of the invention, as explained herein, may be employed in data communications devices, computerized devices and/or software systems for such devices such as those manufactured by Cisco Systems, Inc. of San Jose, Calif.

Figure 1:
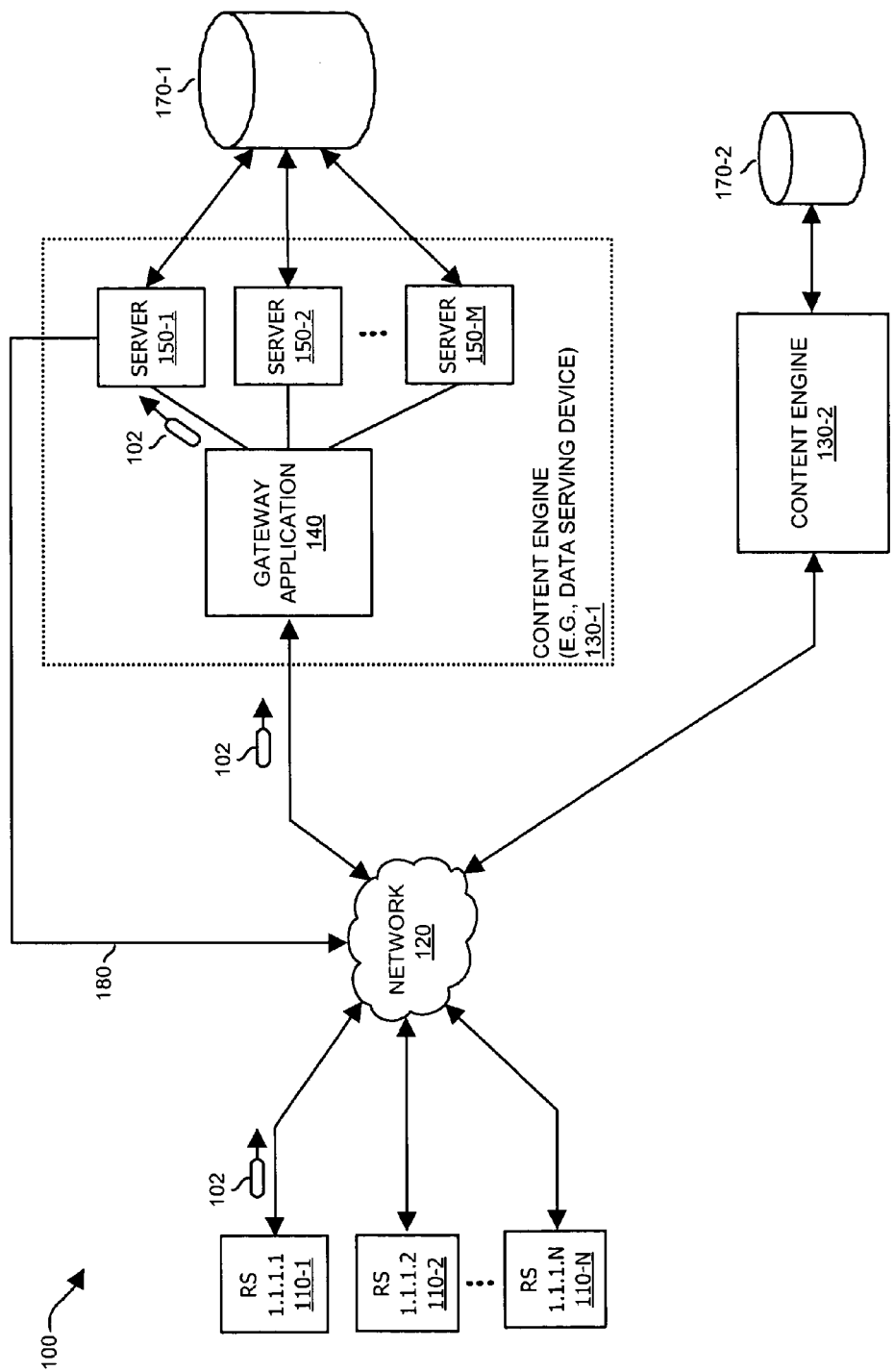
FIG. 1 is a diagram of a communication system including a content engine for serving data according to an embodiment of the invention.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF EMBODIMENTS

Embodiments of the invention include providing a gateway application for use in a content engine to dispatch requests for real-time content to servers that, in turn, service the requests by streaming appropriate real-time content to requesting users. A software communication port of the content engine is reserved to receive request messages from multiple client computers, at least two of the messages including requests for streaming of real-time content according to different selected formats. After identifying properties (e.g., a format for which to receive streaming real-time content) associated with the requests for real-time content, the gateway application identifies corresponding servers of the content engine to serve the real-time content according to the different selected formats. The gateway application forwards the requests for real-time content associated with the request messages to the corresponding servers which, in turn, satisfy the requests by streaming the requested real-time content to the client computers. Use of a gateway application to handle incoming requests for multiple servers reduces a need for separate hardware resources because a common hardware resource such as a single computer may operate multiple server applications to service many different types of requests for media. In one application, the servers of the content engine that service the requests establish corresponding links directly with requesting users to stream data, bypassing the port and gateway application of the content engine on which the corresponding request messages are originally received.

FIG. 1 is a communication system 100 and corresponding content engine 130-1 to serve data information according to an embodiment of the invention. As shown, communication system 100 includes multiple requesting sources 110-1, 110-2, ..., 110-N (labeled as RS in the figures), network 120, content engines 130-1, 130-2, and storage devices 170-1, 170-2. Content engine 130-1 includes gateway application 140 and multiple servers 150-1, 150-2, . . . , 150-M.

In general, content engines 130 operate to receive request messages from request sources 110. For example, as shown, request message 102 generated by request source 110-1 passes through network 120 to content engine 130-1 and, more particularly, gateway application 140. Upon receipt of request message 102, gateway application processes and forwards the request message 102 to corresponding server 150-1 where requested content from storage device 170-1 is forwarded on path 180 over network 120 to request source 110-1. A request message may be redirected to content engine 130-2 (potentially including a similar topology as content engine 130-1) in the event that a request message cannot be serviced using data files stored in storage device 170-1.

Figure 2:
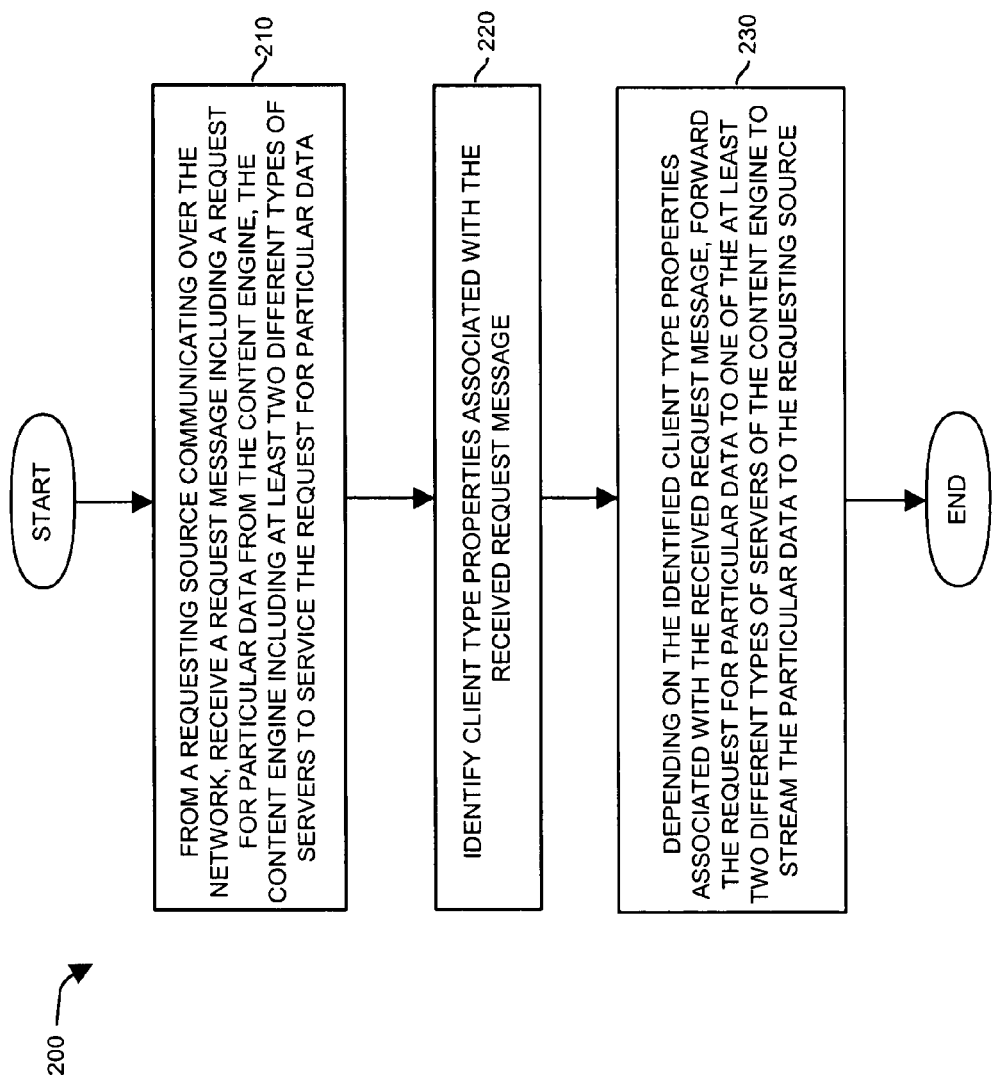
FIG. 2 is a flowchart of a technique supporting transmission of streaming data according to a general embodiment of the invention.

FIG. 2 is a flowchart 200 more particularly describing a technique of utilizing gateway application 140 in content engine 130-1 to process and forward request messages 102 according to an embodiment of the invention.

In step 210, gateway application 140 in content engine 130-1 receives request message 102 including a request for particular data over the network 120. The content engine 130-1 includes at least two different types of servers to service the request for particular data potentially stored in storage device 170-1.

Next in step 220, to service the received request 102, the gateway application 140 identifies client type properties (e.g., a user or agent sending request message, final destination of request message, media file type specified by request message, etc.) associated with the received request message 102. For example, request source 110 may be a client that generates a request message 102 (e.g., a request for streaming real-time audio, video, and other such content rich data) according to the RTSP protocol and TCP/IP (Transmission Control Protocol/Internet Protocol). Internet streaming applications mainly use two kinds of protocols: streaming control protocols, which initiate and maintain the communication between the client and the server, and accomplish controls (start, stop, pause, fast-forward, rewind, etc.) over the stream, and data transfer protocols, which actually carry the streaming data. The Real Time Streaming Protocol (RTSP) is an application-level protocol for control over the delivery of data with real-time properties. As mentioned, it is specified by IETF (International Engineering Task Force) Request For Comments FC 2326. RTSP is widely used as an Internet streaming control protocol, and has become the industry standard adopted by Apple QuickTime, Real Networks, and many other vendors that produce software to support streaming of data. RTSP is a layer 5-7 protocol, using TCP as a layer 4 protocol and is one type of message well-suited for receipt by gateway application 140.

In step 230, gateway application 140 in content engine 130-1 forwards the request for particular data to one of the at least two different types of servers 150 of the content engine 130-1 to stream the particular data to requesting source 110-1 along path 180 and through network 120 depending on the identified client type properties associated with the received request message 102. For example, gateway application 140 may use the User-Agent header in the request message 102 from the requesting source 110 client to decide which server 150 to forward the request. If the user agent is a Real Player, the request is sent to a server 150 such as either a Real proxy or Real server. If the user agent is Quick Time as specified in the received request message 102, and it is a local VoD request, then the request is sent to a Darwin type of server 150.

Use of the gateway application 140 (to process and forward different types of request messages 102) and servers 150 (e.g., server applications) on a common host computer (e.g., content engine 130-1) reduces a need for redundant hardware while providing multiple clients a single point of access and unified handling of requests. Additionally, use of gateway application 140 supports "scalablity" in the event that content engine 130-1 must be modified to include a different number or new type of servers.

Figure 3:
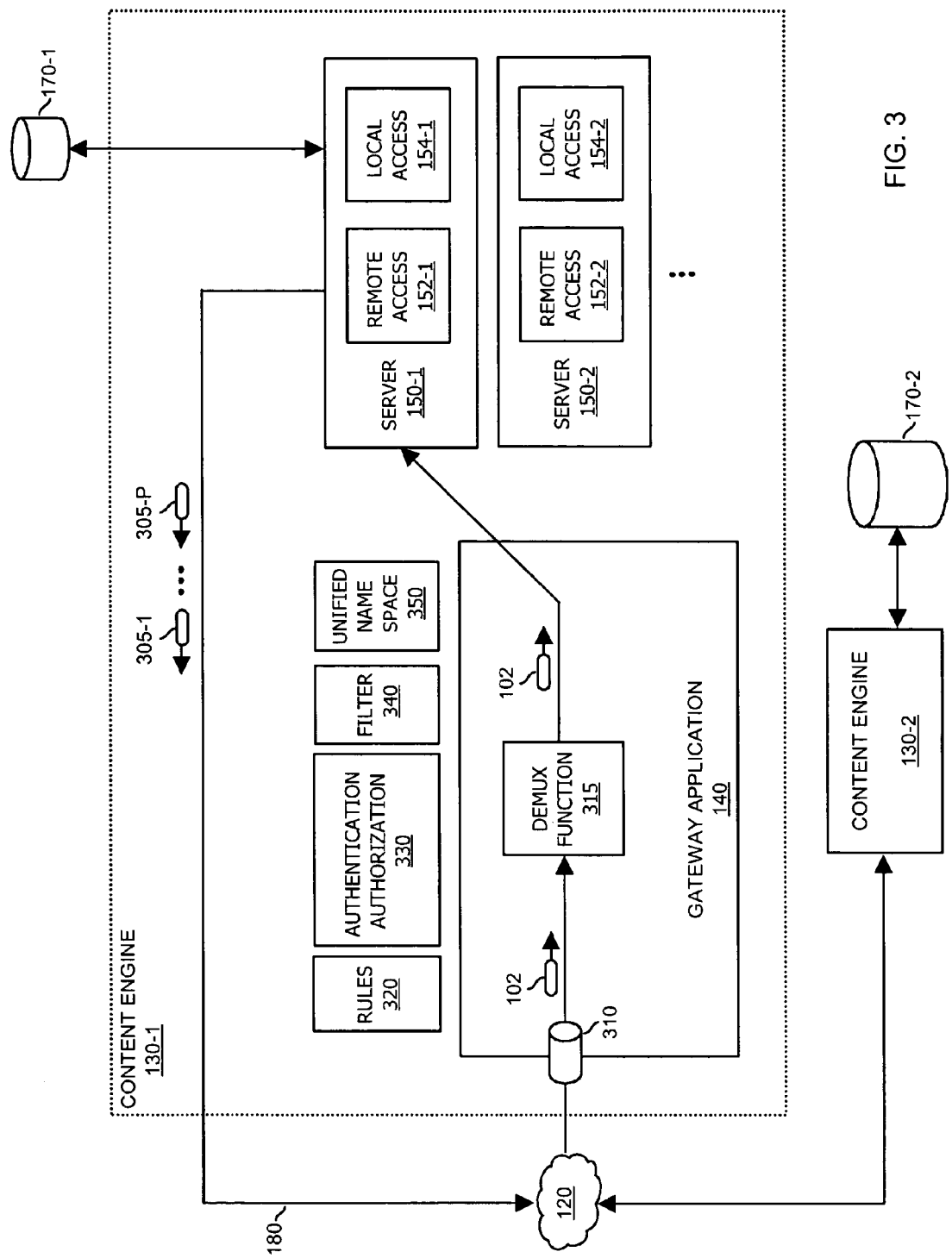
FIG. 3 is a detailed diagram illustrating a gateway application that forwards received requests to an appropriate server application according to an embodiment of the invention.

FIG. 3 is a diagram more particularly illustrating elements of content engine 130-1 according to an embodiment of the invention. As shown, content engine 130-1 includes gateway application 140 and servers 150. Gateway application 140 includes port 310 (e.g., a dedicated TCP socket) on which to receive request messages 102, demultiplexer function 315, rules 320, authentication/authorization 330, filter 340, and unified name space module 350. Servers 150 each include remote access module 152 (for servicing requests 102 remotely such as via content engine 130-2 coupled to storage device 170-2) and local access module 154 (for servicing requests 102 locally via files or content in storage device 170-1).

According to a general mode of operation, gateway application 140 of content engine 130-1 receives request message 102 on port 310 (e.g. a dedicated TCP software communication port or socket such as default port number 554 to receive RTSP traffic). For received request messages, gateway application applies any or all of the following functions prior to forwarding request message 102 on to one of servers 150: rules 320, authentication/authorization 330, filter 340 and unified names space service 350. An order of applying these processing functions may vary depending on the application.

Rules 320 are implemented by gateway application 140 to support the following type of actions: blocking a request, issuance of a TCP reset, do not authenticate, message redirection, rewriting of a request message, etc. For rules that don't apply to RTSP commands, a rules verifier function may perform additional checking. Rules 320 may be applied via a backend daemon that communicates with gateway application 140 via RPC. Note that gateway application itself may be implemented as a daemon process. Rules 320 may include a client library. In such an embodiment, gateway application 140 calls this library to check rules to be applied. Thus, a single RTSP request such as request message 102 may be processed based on one or more rules for checking.

Authentication/Authorization (AA) 330 is optionally implemented by gateway application 140 to support two different types of AA, namely: authentication pass-through and proxy authentication and authorization. For the case of authentication pass-through, the content engine 130-1 tunnels the authentication between requesting source 110 and server 150. Correct pass-through may be applied in Real 5 applications. There are a few different flavors of authentication/authorization. For example:

a) Box authentication decides if a request can access the content engine box.

b) Content authentication may be supprted via
i. an Access Control List (ACL)
ii. IMS-style (re-authenticate with origin server for each piece of content)

Filter 340 may be implemented by gateway application 140 to support URL (Uniform Resource Locator) filtering based on use of a of local good/bad list indicating supported or non-supported types of requests. After receiving a request, gateway application 140 communicates with streaming URL filtering daemon (e.g., filter 340) and gets a block/proceed answer, and then acts accordingly. If filter 340 denies a request, the client receives a "403 Forbidden" error message. If a user has enabled URL filtering with RTSP but we has some internal difficulties (e.g., gateway application is not able to contact URL filtering daemon), a different error code is returned to client.

Unified names space service 350 determines whether requested content is pre-"positioned" (e.g., stored in storage prior to receiving a first request for such content) in the content engine 130 or corresponding storage device 170-1. If so, then the request 102 may be satisfied by forwarding the request message to server 150 and utilizing local access service 154-1 to retrieve data from storage device 170-1. Server 150-1 may send requested content on path 180 (e.g., a UDP link) as data packets 305-1, . . . , 305-P to the requesting source 110-1. If the requested content is not stored in storage device 170-1, then the request 102 may be satisfied by forwarding the request message 102 to a proxy server via remote access service 150-2 of server 150-1. Additionally, the request message 102 may be redirected to a content engine 130-2 and associated storage device 170-2 for servicing. With respect to the latter application, multiple content engines 130 may be implemented to exploit use of a hierarchical set of gateway applications 140. For example, via use of corresponding gateway applications in one embodiment, a request message 102 may be further redirected from a first content engine 130-1 to a second content engine 130-2 for servicing, and from the second content engine 130-2 to another content engine, and so on, until it can be serviced.

In addition to the above functions, gateway application 140 may support Quality of Service (QoS). Supporting QoS with RTSP in gateway application 140 involves setting certain bits on the IP packets of the data stream under RTSP. In one embodiment, gateway application 140 tunnels UDP data from the servers 150 to the requesting sources 110. QoS may also be supported by using Real plug-ins, IP chains, or Kernel change. Servers 150 may provide load-balancing and transaction logging associated with servicing requests. QoS is normally done on data packets, which run on RTP/UDP. Such data packets bypass gateway application 140 because they are directly sent from server 150-1, e.g., to network 120. Thus, if data packets are sent on path 180, then gateway application 140 does not perform QoS operations. Instead, some entity other than gateway application 140 supports QoS such as Real Plug-ins, etc. If gateway application 140 does not bypass data packets on path 180, then gateway application 140 performs QoS operations at the cost of data copying and lower overall performance.

For each request, gateway application 140 creates a client object and a server object. The objects track bookkeeping information, such as the file descriptor for socket connections, IP addresses and ports for various parties, buffers for URLs, headers, and various other information, and internal counters and variables. Each request goes through the client object first, then the server object. For each response, the server object is first used, then the client object. Each object may invoke necessary processing routines at various stages of the transaction.

As discussed, a main function of gateway application 140 is to listen on a configured RTSP port. For each client request coming to this port 310, gateway application 140 will fork a process to individually handle them. This child process will open socket connection with the backend servers 150. When the request message 102 has been forwarded, the child process may be terminated. Use of multiple child process enables gateway application 150 to concurrently process multiple requests messages 102 from different requesting sources 110.

A main process of gateway application 140 listens for requests and creates child working processes.

After applying rules 320, AA 330, filter 340, and unified name space service 350 to received request message 102, gateway application 140 employs demux function 315 to dispatch the request message 102 to the appropriate server. For the case shown in FIG. 3, demux function 315 forwards the request message 102 to server 150-1.

The functional operation of content engine 130-1 will now be more particularly described in connection with the flowchart on FIGS. 4A and 4B.

Figure 4A:
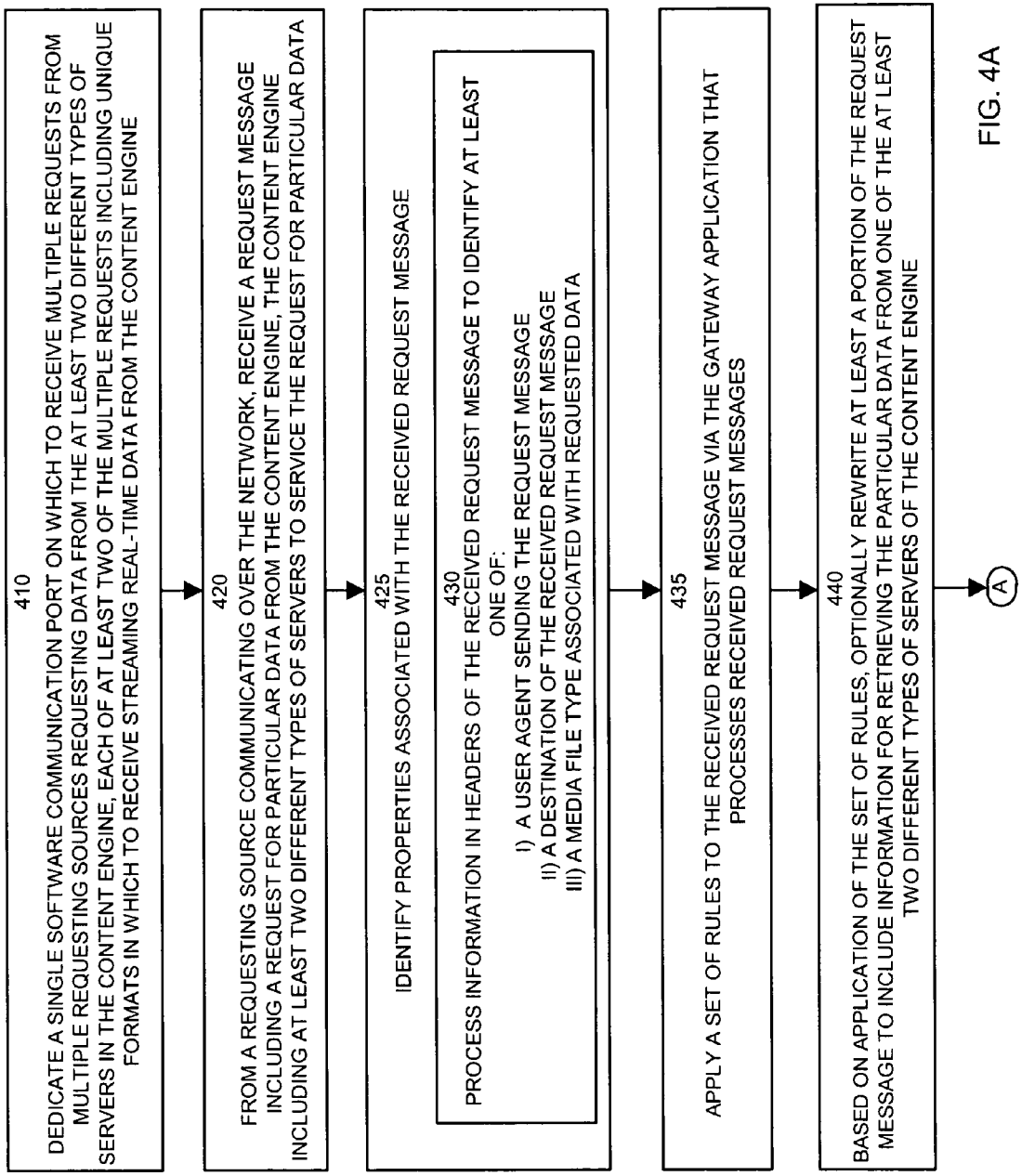
FIGS. 4A and 4B combine to form a flowchart illustrating a technique supporting transmission of streaming data according to an embodiment of the invention.
Figure 4B:
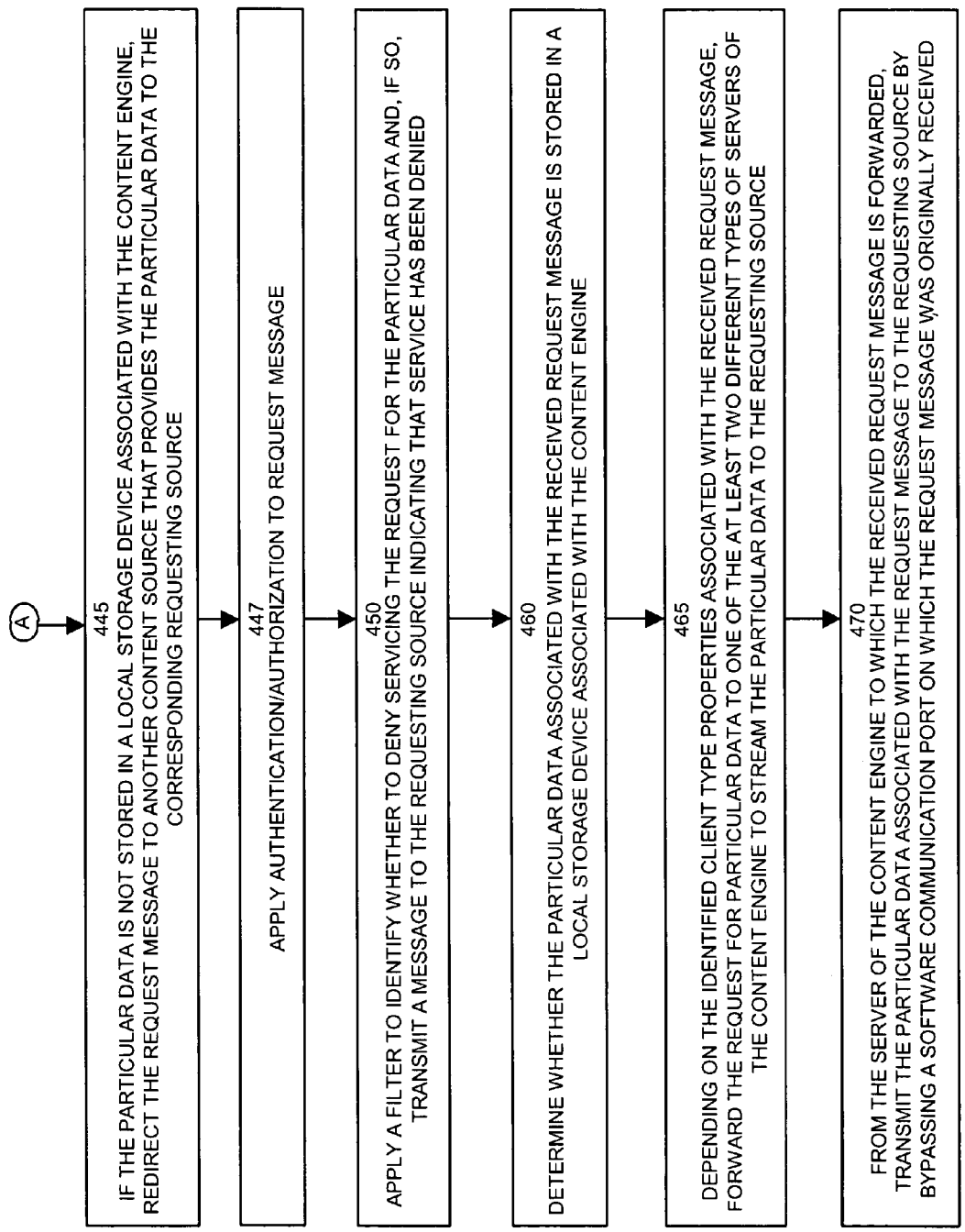

FIGS. 4A and 4B combine to form a flowchart for processing requests 102 at gateway application 140 according to an embodiment of the invention. As mentioned, FIG. 2 discusses a general embodiment of the invention, whereas FIGS. 4A and 4B discuss a more detailed embodiment of the invention. Thus, there may be some overlap with respect to each of the embodiments.

In step 410, content engine 130-1 and, more specifically, gateway application 140 may utilize a single, dedicated software communication port (such as port 310) on which to receive requests from multiple requesting sources 110 that request data from at least two different types of servers 150 in content engine 130-1. Each of at least two of the multiple requests 102 from the same or different requesting sources 110 may include information identifying a unique format in which to receive streaming real-time data from the content engine. Consequently, one requesting source 110-1 may request streaming data from a first server 150-1 of the content engine according to a first format type while a second requesting source 110-2 may request streaming data from a second server 150-2 of the content engine 130-1 according to a different, unrelated second format type. In a specific embodiment, the single (dedicated) software communication port 310 of the gateway application 140 is a port such as a default RTSP (Real Time Streaming Protocol) port number 554 as specified by Request For Comment 2326.

In step 420, gateway application 140 receives request message 102 on port 310.

In step 425, gateway application 140 of the content engine 130-1 identifies client type properties associated with a request message based on processing information in headers of the received request message 102. As shown in step 430, identifying client type properties may include identifying an identity of: i) a user agent sending a request message, ii) a destination of a request message, iii) a media file type associated with requested data, etc.

In one embodiment, the request message 102 received from the corresponding requesting source 110-1 is received according to a predetermined format. In step 435, gateway application 140 applies a set of rules 320 to the received request message 102 and, on behalf of the at least two different types of servers 150 that may have otherwise received the request message 102 if not for its interception by the gateway application 140, the gateway application 140 rewrites at least a portion of the request message 102 in step 440 to include information for retrieving the particular requested data from one of the at least two different types of servers 150 of the content engine 130-1.

Now turning to FIG. 4B, in step 445 and as previously discussed, if the particular requested data is not stored in a local storage device 170-1 associated with the content engine 130-1, the gateway application 140 or corresponding server 150 may redirect the request message 102 in step 445 to another content source 130-2 that provides the particular data to the corresponding requesting source 110-1. Thus, a server 150 of the content engine 130-1 may retrieve a file from a local storage device 170-1 and serve the requesting source 110-1 with requested data or alternatively act as a proxy to service the request. It should be noted that a single file of information may be accessed by multiple servers 150 that each serve the data according to different formats or real-time streaming protocols supported by corresponding clients.

In step 447, gateway application 140 the authentication/authorization 330 to the request message 102.

In step 450 and in addition to applying a set of rules 320 to service the request as discussed above, the gateway application 140 may include a filter 340 to identify whether to deny servicing the request for the particular data. If access to the data is denied, the content engine 130-1 may transmit a reply message to the corresponding requesting source 110-1 indicating that the service associated with the requested content has been denied.

In step 460, gateway application 140 executes unified name space service 350 to determine whether the particular requested data associated with the received request message 102 is stored in a local storage device 170-1 associated with the content engine 130-1. More specifically, unified name space service (UNS) 350 may include a backend database that is queried to determine whether a mapping exists to requested content stored in storage device 170-1. If so, gateway application m 140 may rewrite a received request message 102 such as a URL to include a proper pathname or filename to support retrieving the requested content from storage device 170-1 via server 150-1. If not, gateway may return a message to the requesting source 110-1 that the content is non-existent or at least not stored in storage device 170. In a case in of redirecting, for each request received and after processing the request according to rules 320, AA 330, filter 340, and UNS 350, gateway application 140 sends a response back to a requesting source 110-1 that contains "Use-Proxy" or "Location" header to tell the client to send the request again accordingly.

In step 465, gateway application 140 forwards the request message 102 to the appropriate server 150 depending on the identified properties.

In step 470, the appropriate server 150-1 of the content engine 130-1, to which the request message 102 was forwarded, transmits data packets 305 including the particular data associated with the request message 102 on path 180 to the requesting source 110-1 by bypassing the software communication port 310 of the gateway application 140 on which the request message 102 was originally received. The technique of bypassing the gateway application 140 is more particularly shown in FIG. 6 and corresponding flowchart 700 in FIG. 7.

Note that, as will be discussed later in this specification, the technique of bypassing the gateway application 140 and corresponding port 310 may significantly reduce traffic that must be handled by the gateway application 310. For example, the request messages 102 themselves may be minimal in size compared to a potentially large volume of streaming data packets 305 sent from the servers 150 to the requesting sources 110 such as client computers on network 120. In one application, the content engine stores (e.g., pre-positions) the particular data associated with the request message 102 in a local storage device 170 associated with the content engine 130 prior to receipt of the request message 102.

Figure 5:
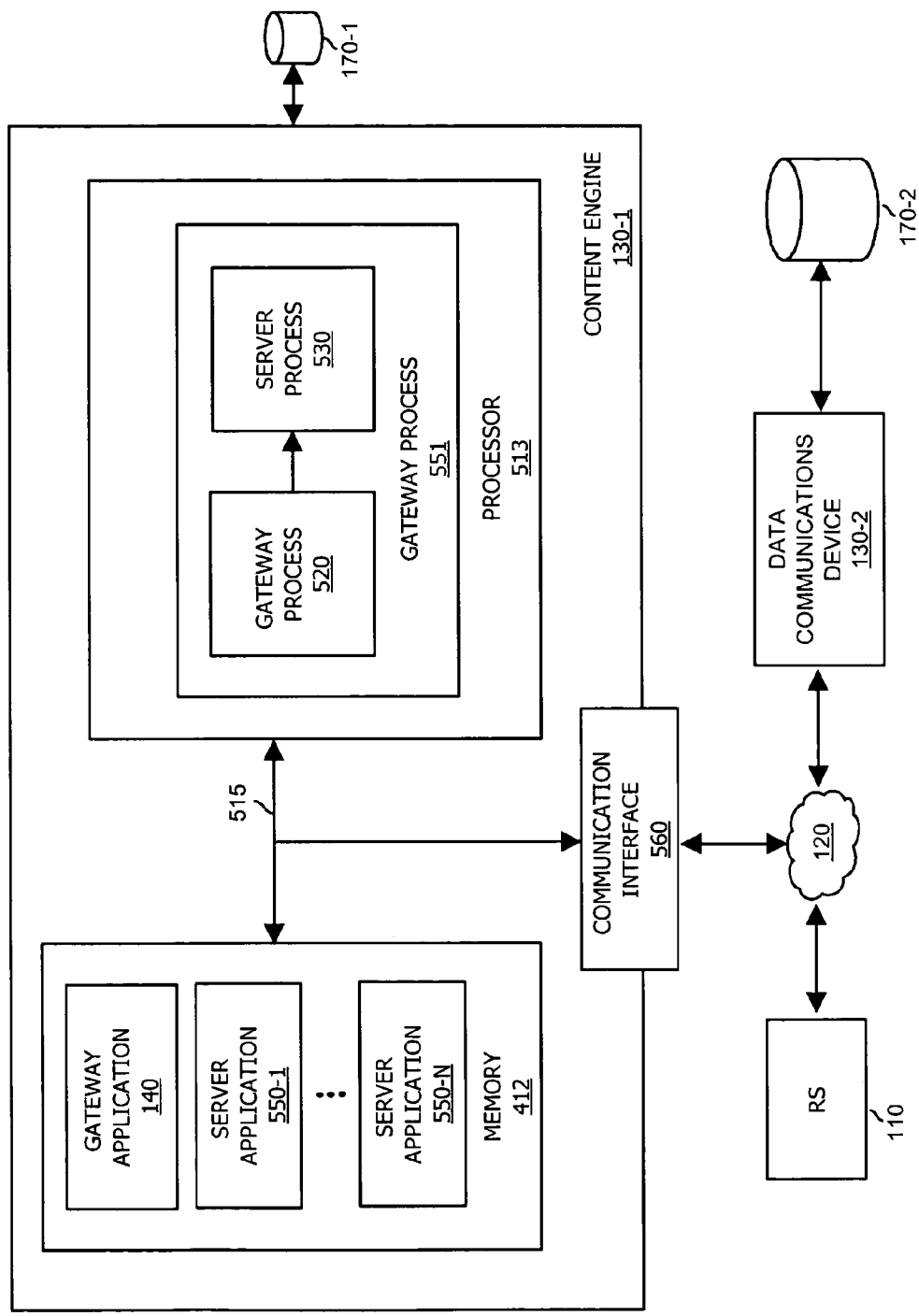
FIG. 5 is a diagram of a computer system and its functional components supporting transmission of streaming data according to an embodiment of the invention.

FIG. 5 is a block diagram of content engine 130-1 according to an embodiment of the present invention. As shown, content engine 130-1 is a computerized device including interconnect 515 such as a data bus or other circuitry interconnecting memory 412 (e.g., memory unit), processor 513, and communication interface 560. Processor 513 may be any type of central processing unit, microprocessor, processing device, controller of other electronic circuitry capable of accessing gateway application 140 to execute, run, interpret, or otherwise operate gateway application 140 as well as server applications 550-1, . . . , 550-N, to process, forward, and satisfy requests 102 from requesting sources 110 according to embodiments of the invention as explained herein. In other words, gateway application 140, server applications 550, and bypass functionality may be embodied as one or multiple software programs that enable content engine 130-1 (and similar types of devices) to satisfy requests for particular data content.

Memory 412 stores gateway application 140, as well as server applications 550 associated with servers 150 of content engine 130-1. In general, the applications in memory 412 represent software code, data and/or logic instructions executed by processor 513. When such code is executed, processor 513 creates request handler process 550 including gateway process 520 and server processes 530. Aspects associated with these processes were previously discussed in FIGS. 1-4 and will be additionally discussed with respect to FIGS. 6 and 7.

Figure 6:
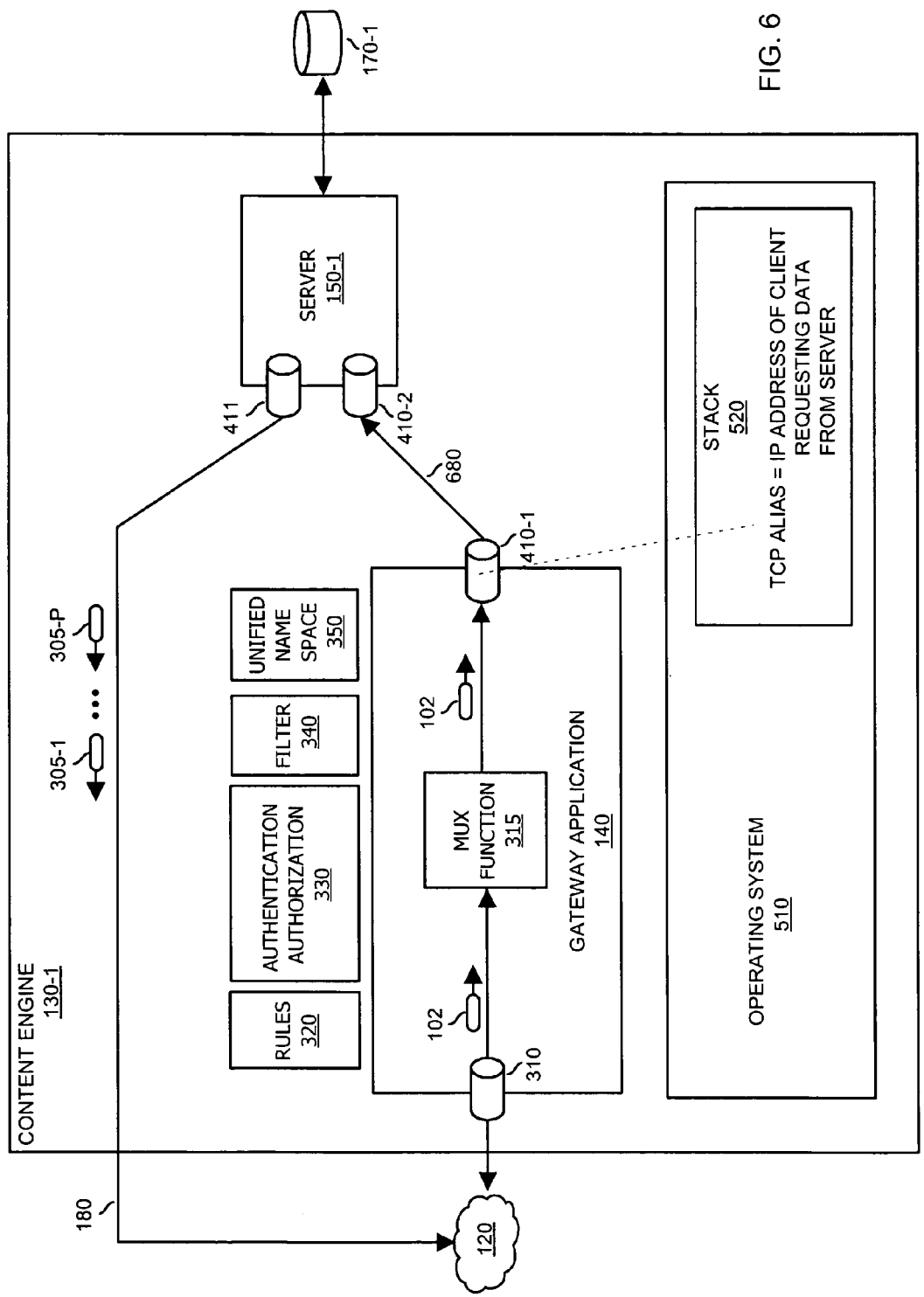
FIG. 6 is a diagram of a content engine and corresponding functional elements to bypass a gateway application according to an embodiment of the invention.

FIG. 6 is a block diagram of content engine 130-1 that supports a bypassing technique according to an embodiment of the invention. FIG. 6 includes similar elements as shown in FIG. 3 as well as additional described features. For example, as shown, content engine 130-1 further displays operating system 510, stack 520, communication port 410-1, communication port 410-2, and communication port 411 in relation to content engine 130-1.

According to one embodiment of the invention, request messages may be satisfied by sending data packets 305 with requested information from the appropriate server 150 through gateway application 140 to the requesting source 110. However, it should be noted that a size of the request messages 102 (e.g., RTSP control data) themselves may be minimal compared to a volume of streaming data information (e.g., RTP/UDP streaming data) sent from the servers 150 to the requesting sources 110. To alleviate the gateway application 140 from being overburdened with traffic, the gateway application 140 may forward the request message 102 including a request for particular data content (and potentially additional RTSP control messages associated with a session of streaming data) to server 150-1 that establishes a direct link via path 180 with the requesting source 110-1 on which to transmit data packets instead of passing through gateway application 140.

More specifically, prior to forwarding a request message 102 to server 150-1, gateway application 140 and server 150-1 set up a link 680 (e.g., a TCP connection established via sending a connection request from gateway application and appropriate handshaking thereafter) identified by endpoint port 410-1 and endpoint port 410-2. Individual links 680 may be established for each of multiple request messages that are forwarded from gateway application 140 to corresponding server 150.

One embodiment of the invention involves spoofing the server 150-1 into believing that an original requesting source 110-1 sent the request message 102 to server 150-1 instead of gateway application 140. Otherwise server 150-1 may attempt to serve the requested data through gateway application 140 to the requesting source 110-1.

Prior to forwarding the request message 102 from gateway application 140 to server 150-1, gateway application 140 (if necessary) modifies the source address of the request message 102 to that of the requesting source 110-1 or originating client even though such a message is sent on a TCP connection between gateway application 140 and server 150-1. Thus, upon forwarding the message 102 to server 150-1 through link 680, the server 150-1 identifies the sender of the message as being requesting source 110-1 instead of gateway application 140 based on header data in the request message 102 including the source address of the requesting source 110-1. Server 150-1 verifies that the requesting source 110-1 is "actually" the source of the request message 102 by sending a message to gateway application 140 inquiring as to the network address associated with port 410-1. Prior to the inquiry, gateway application 140 executes a SET SOCKET command to modify stack 520 to support spoofing the server 150-1. For example, the socket identifier of port 410-1 is set to a TCP alias value identifying the IP address of the requesting source 110-1 that originally sent the message. In one embodiment, gateway application 140 supplies the TCP alias value to the kernel of operating system 510, and when the corresponding server 150 inquires as to the address of the gateway application 140 forwarding the request 102, the kernel supplies the alias to the corresponding server 150. For example, the TCP alias is established at the time the TCP connection (link 680) is initiated, and when the corresponding server 150 requests the associated network address, it is supplied by the kernel of operating system 510 and TCP stack 520, which maintains the endpoint (410-2) without further communication from gateway application 140 through endpoint port 410-1 over link 680. Thus, upon execution of the GET PEER NAME command by server 150-1 for retrieving a network address associated with port 410-1, the operating system 510 identifies and provides the network address as the TCP alias, which is the network address of the requesting source 110-1 instead of gateway application 140.

In this way, the server 150-1 is spoofed into believing that the requesting source 110-1 is the original sender of the request message even though message 102 is sent anew from gateway application 140. Thus, the gateway application 140 will not have to tunnel both directions of data packets such as RTSP control data and RTSP/UDP streaming data. This technique of bypassing the gateway application 140 and corresponding dedicated port 310 on the return path significantly reduces an amount of traffic that must be handled by the gateway application 140. Content engine 130-1 may therefore support higher throughput as a result of saving CPU (Central Processor Unit) and memory bandwidth.

One embodiment of the above technique involves modification to operating system 510 and, more specifically, a Linux kernel's implementation of TCP stack. For example, stack 520 is modified to include the "TCP_ALIAS" as discussed. The initiator (e.g., gateway application 140) of link 680 (e.g., an RTSP/TCP connection) which specifies itself as being "aliased" to the IP address of the original requesting source 110-1. One benefit of modifying the kernel and implementing a modification to stack 520 and inclusion of "TCP_ALIAS" is that no software modifications are required on the receiver side (e.g., port 410-2 or server 150-1) of an RTSP/TCP connection.

In one embodiment, multiple content engines 130 cooperate to service a request message 102. For example, a method of servicing a request may include receiving a request message 102 at a gateway application 140 of a first content engine 130-1, the request message including a request for particular data. Depending on identified properties associated with the received request message 102, the gateway application 140 at the first content engine 130-1 may forward the request message 102 for particular data to a server of a second content engine 130-2, the second content engine including at least two different types of servers to stream data. Bypassing is achieved by establishing a link between the gateway application of the first content engine 130-1 and the server of the second content engine 130-2 on which the request message is forwarded, the gateway application 140 including a software communication port on which to forward the request message on the link. Similar to embodiments as previously discussed, the second content engine includes an operating system (and modified kernel) to maintain a TCP alias associated with the software communication port of the gateway application 140 such that, when the corresponding server at the second content engine 130-2 inquires as to an address of the software communication port of the gateway application 140, an operating system maintaining the alias at the second content engine 130-2 or gateway application 140 of the first content engine 130-1 supplies the TCP alias to the corresponding server to spoof the corresponding server at the second content engine 130-2 that the forwarded request message 102 was received directly from the corresponding requesting source 110-1 instead of the gateway application 140 at the first content engine 130-1. Thus, the technique of bypassing a gateway application can be achieved by servicing a request directly from a server located on another, remotely located content engine 130-2.

Figure 7:
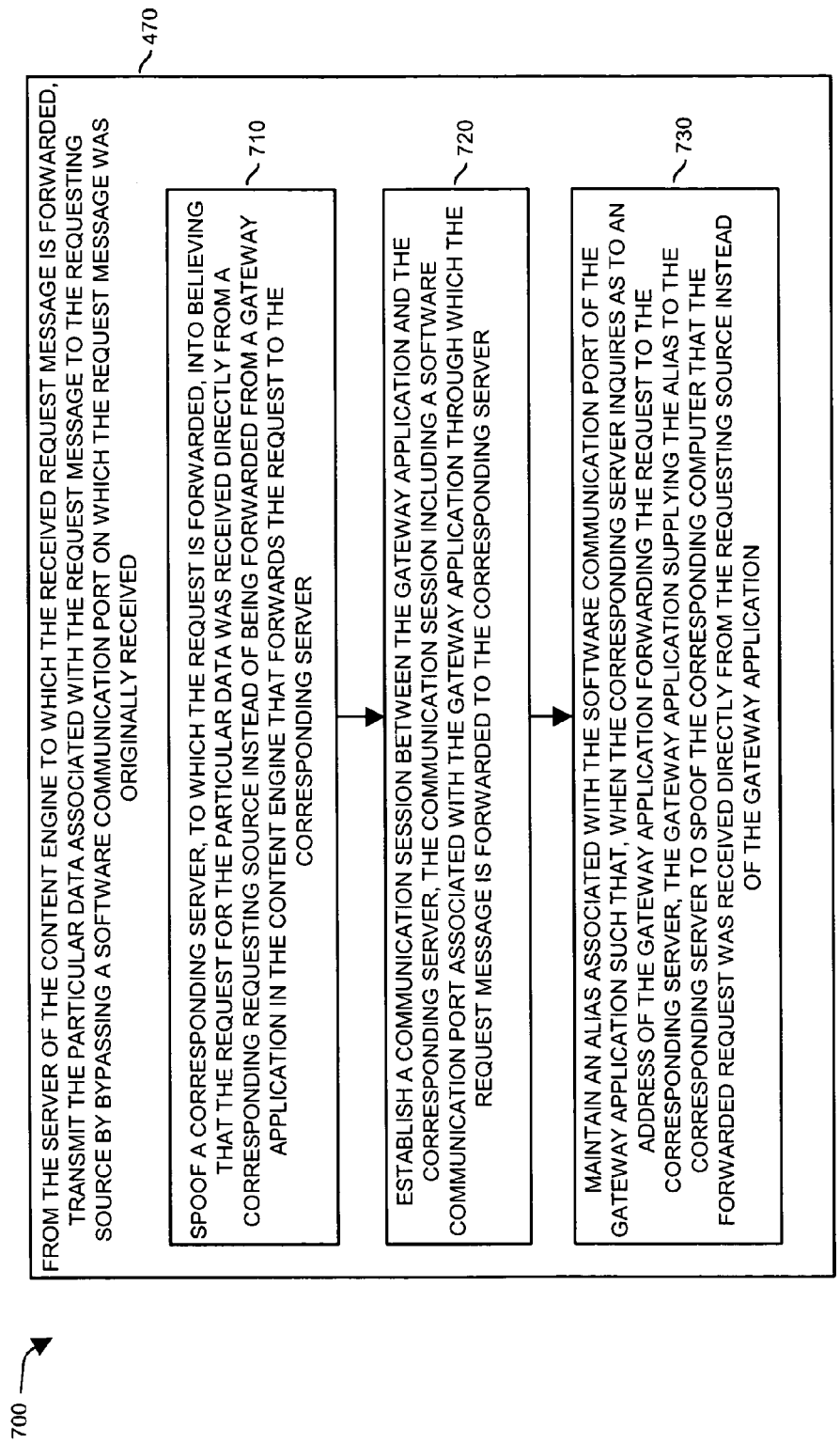
FIG. 7 is a flowchart illustrating a technique of bypassing a gateway application according to an embodiment of the invention.

FIG. 7 is a flow chart more particularly illustrating a technique of bypassing a gateway application according to an embodiment of the invention.

Bypassing the software communication port 310 and gateway application 140 may be achieved by spoofing a corresponding server, to which a request is originally forwarded, into believing that the request for the particular data was received directly from a corresponding requesting source 110-1 instead of being forwarded from the gateway application 140 in the content engine 130-1 that forwards the request to the corresponding server 150-1. Thus, the gateway application 140 may receive requests on a first communication link between the requesting source 110-1 (e.g., a client) and the gateway application 140 of the content engine 130-1. The gateway application 140 may forward a request message 102 over a second link between the gateway application 140 and server 150. Finally, the server 150-1 may serve requested data stream information 305 to the corresponding requesting source based on a third link between the server 150-1 and the requesting source 110-1.

More specifically, in one embodiment, forwarding the request for particular data is supported at least in part by establishing a TCP communication session in step 720 between the gateway application 140 and the corresponding server 150-1. This communication session may include a software communication port 410-1 associated with the gateway application 140 through which the request message 102 is forwarded to the corresponding server 150-1.

In step 730, an operating system 510 of the content engine facilitates maintaining an alias associated with the software communication port 410-1 of the gateway application 140 such that, when the corresponding server 150-1 inquires as to an address of the gateway application 140 forwarding the request to the corresponding server 150-1, the gateway application 140 supplies the alias (e.g., an identity of the requesting source) to the corresponding server 150-1 to spoof the corresponding server 150-1 into believing that the forwarded request was received directly from the requesting source 110-1 instead of the gateway application 140.

Embodiments of the present invention may be employed such that the servers 150 of the content engine 130 run on a single operating system 510 of a computer having access to stored files of raw data that are served to users for playback in real-time. The kernel of the operating system 510 is optionally modified to support spoofing and use of an alias as mentioned above. Thus, use of the aforementioned techniques is particularly well-suited for systems in which the request message 102 includes a request for particular data that, when served to the requesting source from the content engine 130, is played back in real-time for a user.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method to support transmission of streaming data from a content engine coupled to a network, the method comprising:
   from a requesting source communicating over the network, receiving a request message including a request for particular data from he content engine, the content engine including at least two different types of servers to service the request for particular data;
   identifying client type properties associated with the received request message;
   depending on the identified client type properties associated with the received request message, forwarding the request for particular data to one of the at least two different types of servers of the content engine to stream the particular data to the requesting source;
   determining that the particular data associated with the received request message is stored in a local storage device associated with the content engine; and
   from the server of the content engine to which the received request message is forwarded, transmitting the particular data associated with the request message to the requesting source by bypassing a software communication port on which the request message was originally received;
   wherein bypassing the software communication port includes spoofing a corresponding server, to which the request is forwarded, into believing that the request for the particular data was received directly from a corresponding requesting source instead of being forwarded from a gateway application in the content engine that forwards the request to the corresponding server; and
   wherein forwarding the request for particular data is supported at least in part by:
      establishing a communication session between the gateway application and the corresponding server, the communication session including a software communication port associated with the gateway application through which the request message is forwarded to the corresponding server, and
      maintaining an alias associated with the software communication port of the gateway application such that, when the corresponding server inquires as to an address of the gateway application forwarding the request to the corresponding server, a source other than the gateway application supplying the alias to the corresponding server to spoof the corresponding computer that the forwarded request was received directly from the requesting source instead of the gateway application.

2. A method as in claim 1 further comprising:
   dedicating a single software communication port on which to receive multiple requests from multiple requesting sources requesting data from the at least two different types of servers in the content engine, each of at least two of the multiple requests including a unique format in which to receive streaming real-time data from the content engine.

3. A method as in claim 2, wherein the single software communication port is default RTSP (Real Time Streaming Protocol) port number 554 as specified by Request For Comment 2326.

4. A method as in claim 1, wherein identifying client type properties includes:
   processing information in headers of the received request message to identify at least one of:
   i) a user agent sending the request message,
   ii) a destination of the received request message, and
   iii) a media file type associated with requested data.

5. A method as in claim 1, wherein receiving the request message includes
   receiving a request message according to a predetermined format, the method as in claim 1 further comprising:
      applying a set of rules to the received request message via a gateway application that processes received request messages on behalf of the at least two different types of servers; and
      based on application of the set of rules, rewriting at least a portion of the request message to include information for retrieving the particular data from one of the at least two different types of servers of the content engine.

6. A method as in claim 1 further comprising:
   if the particular data is not stored in a local storage device associated with the content engine, redirecting the request message to another content source that provides the particular data to the corresponding requesting source.

7. A method as in claim 1 further comprising:
   applying a filter to identify whether to deny servicing the request for the particular data and, if so, transmitting a message to the requesting source indicating that service has been denied.

8. A method as in claim 1 further comprising:
   utilizing a modified operating system in the content engine to support providing an alias to a corresponding server, to which the request is forwarded, in response to the corresponding server inquiring as to a network address associated with an application from which the request is received.

9. A method as in claim 1 further comprising:
   prior to receipt of the request message, storing the particular data associated with the request message in a local storage device associated with the content engine.

10. A method as in claim 1, wherein the request message includes a request for particular data that, when served to the requesting source from the content engine, is played back in real-time for a user.

11. A method as in claim 10, wherein the servers of the content engine run on a single operating system of a computer having access to stored files of raw data that are served to the user for playback in real-time.

12. A method as in claim 1 further comprising:
   reserving the software communication port of the content engine to receive request messages from multiple client computers, at least two of which request streaming of real-time content according to different selected formats;
   providing the gateway application in the content engine to process the request messages received on the software communication port, the gateway application identifying corresponding servers of the content engine to serve the real-time content according to the different selected formats;

forwarding requests for streaming of real-time content associated with the request messages to the corresponding servers; and from the corresponding servers of the content engine, transmitting the appropriate real-time content from the content engine to the multiple client computers by bypassing the software communication port of the gateway application, wherein bypassing the software communication port includes spoofing the servers into believing that the requests for real-time content were received from corresponding client computers instead of being forwarded from the gateway application to the corresponding servers.

13. A method as in claim 1, wherein a first server is arranged to respond to requests for a first media file type; wherein a second server is arranged to respond to requests for a second media file type; and wherein forwarding the request for particular data includes:

(i) sending the request for particular data to the first server when the identified client type properties indicate that the client is associated with the first media file type, and alternatively (ii) sending the request for particular data to the second server when the identified client type properties indicate that the client is associated with the second media file type.

14. A computer system coupled to a network that supports transmission of streaming data, the computer system including:

a processor;

a memory unit that stores instructions associated with an application executed by the processor;

a communication interface that supports communication with other nodes of the physical network; and an interconnect coupling the processor, the memory unit, and the communication interface, enabling the computer system to execute the application and perform operations of:

from a requesting source communicating over the network, receiving a request message including a request for particular data from the content engine, the content engine including at least two different types of servers to service the request for particular data;

identifying client type properties associated with the received request message;

depending on the identified client type properties associated with the received request message, forwarding the request for particular data to one of the at least two different types of servers of the content engine to stream the particular data to the requesting source;

determining that the particular data associated with the received request message is stored in a local storage device associated with the content engine; and from the server of the content engine to which the received request message is forwarded, transmitting the particular data associated with the request message to the requesting source by bypassing a software communication port on which the request message was originally received;

wherein bypassing the software communication port includes spoofing a corresponding server, to which the request is forwarded, into believing that the request for the particular data was received directly from a corresponding requesting source instead of being forwarded from a gateway application in the content engine that forwards the request to the corresponding server; and wherein forwarding the request for particular data is supported at least in part by:

establishing a communication session between the gateway application and the corresponding server, the communication session including a software communication port associated with the gateway application through which the request message is forwarded to the corresponding server, and maintaining an alias associated with the software communication port of the gateway application such that, when the corresponding server inquires as to an address of the gateway application forwarding the request to the corresponding server, an operating system maintaining the alias supplies the alias to the corresponding server to spoof the corresponding computer that the forwarded request was received directly from the requesting source instead of the gateway application.

15. A computer system as in claim 14 that additionally performs operations of:

dedicating a single software communication port on which to receive multiple requests from multiple requesting sources requesting data from the at least two different types of servers in the content engine, each of at least two of the multiple requests including a unique format in which to receive streaming real-time data from the content engine.

16. A computer system as in claim 15, wherein the single software communication port is default RTSP (Real Time Streaming Protocol) port number 554 as specified by Request For Comment 2326.

17. A computer system as in claim 14, wherein identifying client type properties includes:

processing information in headers of the received request message to identify at least one of:

i) a user agent sending the request message, ii) a destination of the received request message, and iii) a media file type associated with requested data.

18. A computer system as in claim 14, wherein receiving the request message includes receiving a request message according to a predetermined format, the computer system as in claim 14 additionally performing operations of:

applying a set of rules to the received request message via a gateway application that processes received request messages on behalf of the at least two different types of servers; and based on application of the set of rules, rewriting at least a portion of the request message to include information for retrieving the particular data from one of the at least two different types of servers of the content engine.

19. A computer system as in claim 14 that additionally performs operations of:

if the particular data is not stored in a local storage device associated with the content engine, redirecting the request message to another content source that provides the particular data to the corresponding requesting source.

20. A computer system as in claim 14 that additionally performs operations of:

applying a filter to identify whether to deny servicing the request for the particular data and, if so, transmitting a message to the requesting source indicating that service has been denied.

21. A computer system as in claim 14 that additionally performs operations of:
utilizing a modified kernel and corresponding stack in an operating system of the content engine to support providing an alias to a corresponding server, to which the request is forwarded, in response to the corresponding server inquiring as to a network address associated with an application from which the request is received.

22. A computer system as in claim 14 that additionally performs operations of:
prior to receipt of the request message, storing the particular data associated with the request message in a local storage device associated with the content engine.

23. A computer system as in claim 14, wherein the request message includes a request for particular data that, when served to the requesting source from the content engine, is played back in real-time for a user.

24. A computer system as in claim 23, wherein the servers of the content engine run on a single operating system of a computer having access to stored files of raw data that are served to the user for playback in real-time.

25. A computer system as in claim 14 that additionally performs the operations of:
reserving the software communication port of the content engine to receive request messages from multiple client computers, at least two of which request streaming of real-time content according to different selected formats;
providing the gateway application in the content engine to process the request messages received on the software communication port, the gateway application identifying corresponding servers of the content engine to serve the real-time content according to the different selected formats;
forwarding requests for streaming of real-time content associated with the request messages to the corresponding servers; and
from the corresponding servers of the content engine, transmitting the appropriate real-time content from the content engine to the multiple client computers by bypassing the software communication port of the gateway application, wherein bypassing the software communication port includes spoofing the servers into believing that the requests for real-time content were received from corresponding client computers instead of being forwarded from the gateway application to the corresponding servers.

26. A computer system as in claim 14, wherein a first server is arranged to respond to requests for a first media file type; wherein a second server is arranged to respond to requests for a second media file type; and wherein the computer system, when forwarding the request for particular data, is arranged to:
(i) send the request for particular data to the first server when the identified client type properties indicate that the client is associated with the first media file type, and alternatively (ii) send the request for particular data to the second server when the identified client type properties indicate that the client is associated with the second media file type.

27. A method for supporting transmission of streaming data from a content engine coupled to a network, the method comprising:
from multiple requesting sources communicating over the network, receiving request messages including corresponding requests for particular data from the content engine, the content engine including at least two different types of servers to service the requests for the particular data according to corresponding at least two different types of streaming formats;
executing a gateway application in the content engine to identify client type properties associated with each of the request messages;
depending on the identified client type properties associated with each of the request messages as identified by the gateway application, selectively forwarding the requests associated with each of the request messages to one of the at least two different types of servers to stream the particular data from the content engine to the requesting sources, the content engine being coupled to a storage device that stores at least one file of raw data content capable of being served according to the at least two different types of streaming formats;
determining that the particular data associated with each of the received request messages is stored in a local storage device associated with the content engine; and
from the server of the content engine to which each of the received request messages is forwarded, transmitting the particular data associated with each of the request messages to the requesting source by bypassing a software communication port on which each of the request messages was originally received;
wherein bypassing the software communication port includes spoofing a corresponding server, to which each of the requests is forwarded, into believing that each of the requests for the particular data was received directly from a corresponding requesting source instead of being forwarded from a gateway application in the content engine that forwards each of the requests to the corresponding server; and
wherein forwarding the request for particular data is supported at least in part by:
establishing a communication session between the gateway application and the corresponding server, the communication session including a software communication port associated with the gateway application through which each of the request messages is forwarded to the corresponding server, and
maintaining an alias associated with the software communication port of the gateway application such that, when the corresponding server inquires as to an address of the gateway application forwarding each of the requests to the corresponding server, a source other than the gateway application supplying the alias to the corresponding server to spoof the corresponding computer that the each of forwarded requests was received directly from the requesting source instead of the gateway application.

28. A computer system that supports transmission of streaming data from a content engine coupled to a network, the computer system including:
means for receiving a request message including a request for particular data from the content engine from a requesting source communicating over the network, the content engine including at least two different types of servers to service the request for particular data;
processing means for identifying client type properties associated with the received request message;
means for forwarding the request for particular data to one of the at least two different types of servers of the content engine to stream the particular data to the requesting source depending on the identified client type properties associated with the received request message;

means for determining that the particular data associated with the received request message is stored in a local storage device associated with the content engine; and from the server of the content engine to which the received request message is forwarded, means for transmitting the particular data associated with the request message to the requesting source by bypassing a software communication port on which the request message was originally received;

wherein bypassing the software communication port includes spoofing a corresponding server, to which the request is forwarded, into believing that the request for the particular data was received directly from a corresponding requesting source instead of being forwarded from a gateway application in the content engine that forwards the request to the corresponding server; and wherein means for forwarding the request for particular data is supported at least in part by:

means for establishing a communication session between the gateway application and the corresponding server, the communication session including a software communication port associated with the gateway application through which the request message is forwarded to the corresponding server, and means for maintaining an alias associated with the software communication port of the gateway application such that, when the corresponding server inquires as to an address of the gateway application forwarding the request to the corresponding server, an operating system maintaining the alias supplies the alias to the corresponding server to spoof the corresponding computer that the forwarded request was received directly from the requesting source instead of the gateway application.

29. A computer program product including a computer-readable medium having instructions stored thereon for processing data information, such that the instructions, when carried out by a processing device, enable the processing device to perform the steps of:

from a requesting source communicating over the network, receiving a request message including a request for particular data from the content engine, the content engine including at least two different types of servers to service the request for particular data;

identifying client type properties associated with the received request message;

depending on the identified client type properties associated with the received request message, forwarding the request for particular data to one of the at least two different types of servers of the content engine to stream the particular data to the requesting source;

determining that the particular data associated with the received request message is stored in a local storage device associated with the content engine; and from the server of the content engine to which the received request message is forwarded, transmitting the particular data associated with the request message to the requesting source by bypassing a software communication port on which the request message was originally received;

wherein bypassing the software communication port includes spoofing a corresponding server, to which the request is forwarded, into believing that the request for the particular data was received directly from a corresponding requesting source instead of being forwarded from a gateway application in the content engine that forwards the request to the corresponding server; and wherein forwarding the request for particular data is supported at least in part by:

establishing a communication session between the gateway application and the corresponding server, the communication session including a software communication port associated with the gateway application through which the request message is forwarded to the corresponding server, and maintaining an alias associated with the software communication port of the gateway application such that, when the corresponding server inquires as to an address of the gateway application forwarding the request to the corresponding server, a source other than the gateway application supplying the alias to the corresponding server to spoof the corresponding computer that the forwarded request was received directly from the requesting source instead of the gateway application.

30. A method to support transmission of streaming data, the method comprising:

from a requesting source communicating over a network, receiving a request message at a gateway application of a first content engine, the request message including a request for particular data, the first content engine including at least two different types of servers to service the request for particular data;

identifying properties associated with the received request message;

depending on the identified properties associated with the received request message, forwarding the request for particular data to a server of a second content engine, the second content engine including at least two different types of servers to stream data;

establishing a link between the gateway application of the first content engine and the server of the second content engine on which the request message is forwarded, the gateway application including a software communication port on which to forward the request message on the link; and maintaining an alias associated with the software communication port of the gateway application such that, when the corresponding server at the second content engine inquires as to an address of the software communication port of the gateway application, an operating system maintaining the alias supplies the alias to the corresponding server to spoof the corresponding server at the second content engine that the forwarded request was received directly from the requesting source instead of the gateway application at the first content engine.

* * * * *